United States Patent
Khachaturian

(10) Patent No.: US 10,184,587 B1
(45) Date of Patent: Jan. 22, 2019

(54) UNDERWATER PIPE LIFTING AND CUTTING APPARATUS AND METHOD

(71) Applicant: Jon Khachaturian, New Orleans, LA (US)

(72) Inventor: Jon Khachaturian, New Orleans, LA (US)

(73) Assignee: VERSABAR, INC., Houston, TX (US)

( * ) Notice: Subject to any disclaimer, the term of this patent is extended or adjusted under 35 U.S.C. 154(b) by 0 days.

(21) Appl. No.: 15/479,768

(22) Filed: Apr. 5, 2017

Related U.S. Application Data

(60) Provisional application No. 62/329,004, filed on Apr. 28, 2016.

(51) Int. Cl.
| | | |
|---|---|---|
| *E02D 9/04* | (2006.01) | |
| *B23D 57/00* | (2006.01) | |
| *F16L 1/16* | (2006.01) | |
| *F16L 1/20* | (2006.01) | |

(52) U.S. Cl.
CPC .......... *F16L 1/166* (2013.01); *B23D 57/0084* (2013.01); *F16L 1/207* (2013.01)

(58) Field of Classification Search
CPC ............ B23D 57/0084; B23D 57/0007; B23D 2017/0052; E02D 9/04; E02B 2017/0052
USPC ............ 405/195.1–228; 30/92–97; 83/651.1, 83/745, 743, 54, 796, 820, 946, 794, 797, 83/798, 809, 810, 661, 917; 451/310, 451/439; 29/890.031, 402.03, 402.06
See application file for complete search history.

(56) References Cited

U.S. PATENT DOCUMENTS

| | | | | |
|---|---|---|---|---|
| 2,617,678 A * | 11/1952 | Kelso | ...................... | B66C 1/422 294/113 |
| 3,578,233 A * | 5/1971 | Meister | ...................... | F16L 1/26 228/107 |
| 3,732,701 A * | 5/1973 | Lynch | ...................... | E02F 5/105 254/105 |
| 3,797,260 A * | 3/1974 | Webb | ...................... | F16L 1/06 138/105 |
| 3,841,105 A * | 10/1974 | Cannon | ...................... | F16L 1/201 405/172 |
| 4,091,514 A * | 5/1978 | Motes-Conners | ...... | B23C 3/007 228/29 |
| 4,129,011 A * | 12/1978 | Demers | ...................... | F16L 1/168 405/169 |
| 4,155,669 A * | 5/1979 | Rochelle | ...................... | F16L 1/26 405/158 |
| 4,218,158 A * | 8/1980 | Tesson | ...................... | F16L 1/26 405/170 |
| 4,234,268 A * | 11/1980 | Scodino | ...................... | F16L 55/136 405/158 |
| 4,332,510 A * | 6/1982 | Ferrentino | ............. | B63C 11/48 294/66.1 |
| 4,436,450 A * | 3/1984 | Reed | ...................... | F16L 1/20 405/171 |
| 4,499,691 A * | 2/1985 | Karazim | ............. | B23D 45/006 376/260 |
| 5,044,827 A * | 9/1991 | Gray | ...................... | F16L 1/166 405/158 |

(Continued)

*Primary Examiner* — Benjamin F Fiorello
*Assistant Examiner* — Edwin J Toledo-Duran
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

An improved method and apparatus is provided for underwater salvage of a pipeline, pipe section, pipe, tubular, elongated object, riser, beam or the like. A specially configured tool both grips and cuts the pipe (or object) at a selected locale.

27 Claims, 4 Drawing Sheets

(56) References Cited

U.S. PATENT DOCUMENTS

| | | | | |
|---|---|---|---|---|
| 5,288,172 | A | * | 2/1994 | Reuhl ............... E02B 3/023 405/163 |
| 5,361,748 | A | * | 11/1994 | Matteucci ........... B23D 53/003 125/21 |
| 5,458,439 | A | * | 10/1995 | Hall ................ F16L 1/26 405/158 |
| 5,524,517 | A | * | 6/1996 | Robinson ......... B23D 57/0007 125/16.01 |
| 6,267,037 | B1 | * | 7/2001 | McCoy, Jr. ...... B23D 57/0007 83/745 |
| 6,290,432 | B1 | * | 9/2001 | Exley ............... B08B 9/023 137/317 |
| 7,527,006 | B2 | * | 5/2009 | Khachaturian ......... B63C 3/06 114/50 |
| 7,922,424 | B2 | * | 4/2011 | Clark, II .......... B23D 57/0007 405/156 |
| 8,449,221 | B1 | * | 5/2013 | Lugo ............... F16L 1/26 405/169 |
| 8,475,081 | B2 | * | 7/2013 | Clark, II ............ B63B 35/03 405/156 |
| 8,517,634 | B1 | * | 8/2013 | Liso ................ F16L 1/26 405/158 |
| 8,696,245 | B2 | * | 4/2014 | Clark, II ............ B63B 35/03 405/156 |
| 8,833,219 | B2 | * | 9/2014 | Pierce ............. B23D 57/0007 83/200.1 |
| 9,138,817 | B1 | | 9/2015 | Khachaturian |
| 9,186,805 | B2 | * | 11/2015 | Switatowy ........ B23D 57/0084 |
| 9,636,761 | B2 | * | 5/2017 | Harper ............ B23D 57/0038 |
| 2005/0201832 | A1 | * | 9/2005 | Edfeldt ............ F16L 1/123 405/159 |
| 2006/0115331 | A1 | * | 6/2006 | Matteucci ........ B23D 57/0084 405/156 |
| 2008/0022830 | A1 | * | 1/2008 | Lawler ........... B23D 57/0061 83/651.1 |
| 2009/0314149 | A1 | * | 12/2009 | Clark, II ......... B23D 57/0007 83/651.1 |
| 2010/0186564 | A1 | * | 7/2010 | Pierce ............ B23D 57/0007 83/72 |
| 2011/0214543 | A1 | * | 9/2011 | Shae ............. B23D 57/0007 83/54 |
| 2012/0114420 | A1 | * | 5/2012 | Lazzarin ............ E02F 5/006 405/171 |
| 2014/0334880 | A1 | * | 11/2014 | Roodenburg .......... F16L 1/18 405/166 |
| 2015/0114189 | A1 | | 4/2015 | Khachaturian |

* cited by examiner

UNDERWATER PIPE LIFTING AND CUTTING APPARATUS AND METHOD

CROSS-REFERENCE TO RELATED APPLICATIONS

This is a nonprovisional patent application of U.S. Provisional Patent Application Ser. No. 62/329,004, filed 28 Apr. 2016, which is hereby incorporated herein by reference.

Priority of US Provisional Patent Application Ser. No. 62/329,004, filed 28 Apr. 2016, which is incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the underwater and deep water salvage of elongated objects such as pipelines, pipe sections, tubulars, risers and elongated beams and the like. More particularly, the present invention relates to an improved method and apparatus for salvaging pipe, pipelines, risers, tubulars and elongated objects with a tool having jaws that can be opened and closed, special rigging and a cutting line wherein the tool can be lifted and lowered from a vessel (e.g., barge), the rigging includes a cutting line that is rigged to the tool so that the cutting line is rotatably supported and engages the pipe to be cut, and wherein movement of the cutting line (e.g., back and forth movement) saws or cuts the object (pipe, tubular, elongated member).

2. General Background of the Invention

In the offshore oil and gas well drilling and production industry, a problem exists when pipelines, pipe sections, risers, tubulars, beams, elongated members or the like are abandoned on the seabed or fall to the seabed. These objects must be removed as they can pose a threat to the environment, to fishing (e.g., shrimper's nets), and can be a hazard to navigation. The problem is complicated because such abandoned pipelines, risers and the like can be thousands of feet in length.

The following U.S. Patents and Publications are incorporated herein by reference:

| PAT./PUB NO. | TITLE | ISSUE DATE MM-DD-YYYY |
| --- | --- | --- |
| US2015/0114189 | METHOD AND APPARATUS FOR REMOVING UNDERWATER PLATFORMS | Apr. 30, 2015 |
| 9,138,817 | METHOD AND APPARATUS FOR REMOVING UNDERWATER PLATFORMS | Sep. 22, 2015 |

BRIEF SUMMARY OF THE INVENTION

The apparatus of the present invention solves the problems confronted in the art in a simple and straightforward manner. What is provided is an underwater pipe, tubular and elongated member salvage system.

The system includes a floating vessel.

The system includes multiple powered cable handling devices on the vessel including one or more winches.

The system includes a tool with a first frame, a second frame and a connection that enables one frame to move relative to the other frame.

In one embodiment each frame of the system has a lower end portion with a jaw.

In one embodiment each frame of the system has an upper end portion with a counterweight.

The system includes a first rigging between the vessel and the tool that enables the tool to be raised or lowered relative to the vessel.

The system includes a second rigging enabling the jaws to be moved apart.

In one embodiment the system includes a cutting line having first and second end portions positioned to connect with first and second winches on the vessel.

The system includes roller guides on the tool support the cutting line in a position that enables the cutting line to cut a pipe, tubular or elongated member that is gripped between the jaws by movement of the cutting line relative to the pipe tubular or elongated member.

The upper end portion of one or both frames has a counterweight.

The system includes a relaxation of the second rigging that closes the jaws.

In one embodiment each frame has an ell shape.

Each frame has padeyes and first and second lifting lines attached to the padeyes and to the vessel.

The cutting line engages the uppermost surface of the pipe, tubular or elongated object to be cut.

Each frame has a first roller guide next to the first jaw and a second roller guide next to the second jaw.

Each frame has an upper end portion with a sheave that is engaged by the cutting cable.

In one embodiment the cutting cable engages a lower portion of each the first and second roller guides.

In one embodiment the cable handling devices are winches.

The present invention also provides is an underwater method of salvage.

The method includes the step of providing a floating vessel.

The method includes the step of providing multiple powered cable handling devices on the vessel including one or more winches.

The method includes the step of providing a tool that includes a first frame, a second frame and a connection that enables one frame to move relative to the other frame, each frame having a lower end portion with a jaw, and each frame having an upper end portion with a weight or counterweight.

The method includes the step of rigging cabling between the vessel and the tool that enables the tool to be raised or lowered relative to the vessel.

The method includes the step of rigging cabling to the tool that enables the jaws to be moved apart.

The method includes the step of rigging a cutting line to the tool having first and second end portions that are positioned to connect with first and second winches on the vessel.

The method includes the step of using roller guides on the tool to support the cutting line in a position that enables the cutting line to cut a pipe, tubular or elongated member.

The method includes the step of gripping the pipe between the jaws by movement of the cutting line relative to the pipe tubular or elongated member.

The method includes the step of cutting the pipe with the cutting line.

In one embodiment the upper end portion of one or both frames has a counterweight.

In one embodiment the relaxing at least some of the rigging closes the jaws.

In one embodiment each frame has a generally ell shape.

In one embodiment each frame has padeyes and first and second lifting lines attached to the padeyes and to the vessel, wherein the lifting lines enable selective raising or lowering of the tool.

In one embodiment the method includes engaging the uppermost surface of the pipe, tubular or elongated object to be cut with the cutting cable.

In one embodiment each frame has a first roller guide next to the first jaw and a second roller guide next to the second jaw, and the method further comprises the step of supporting the cutting cable with said guides.

In one embodiment each frame has an upper end portion with a sheave that is engaged by the cutting cable.

In one embodiment wherein the cutting cable engages a lower portion of each said first and second roller guides.

In one embodiment the cable handling devices are winches.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
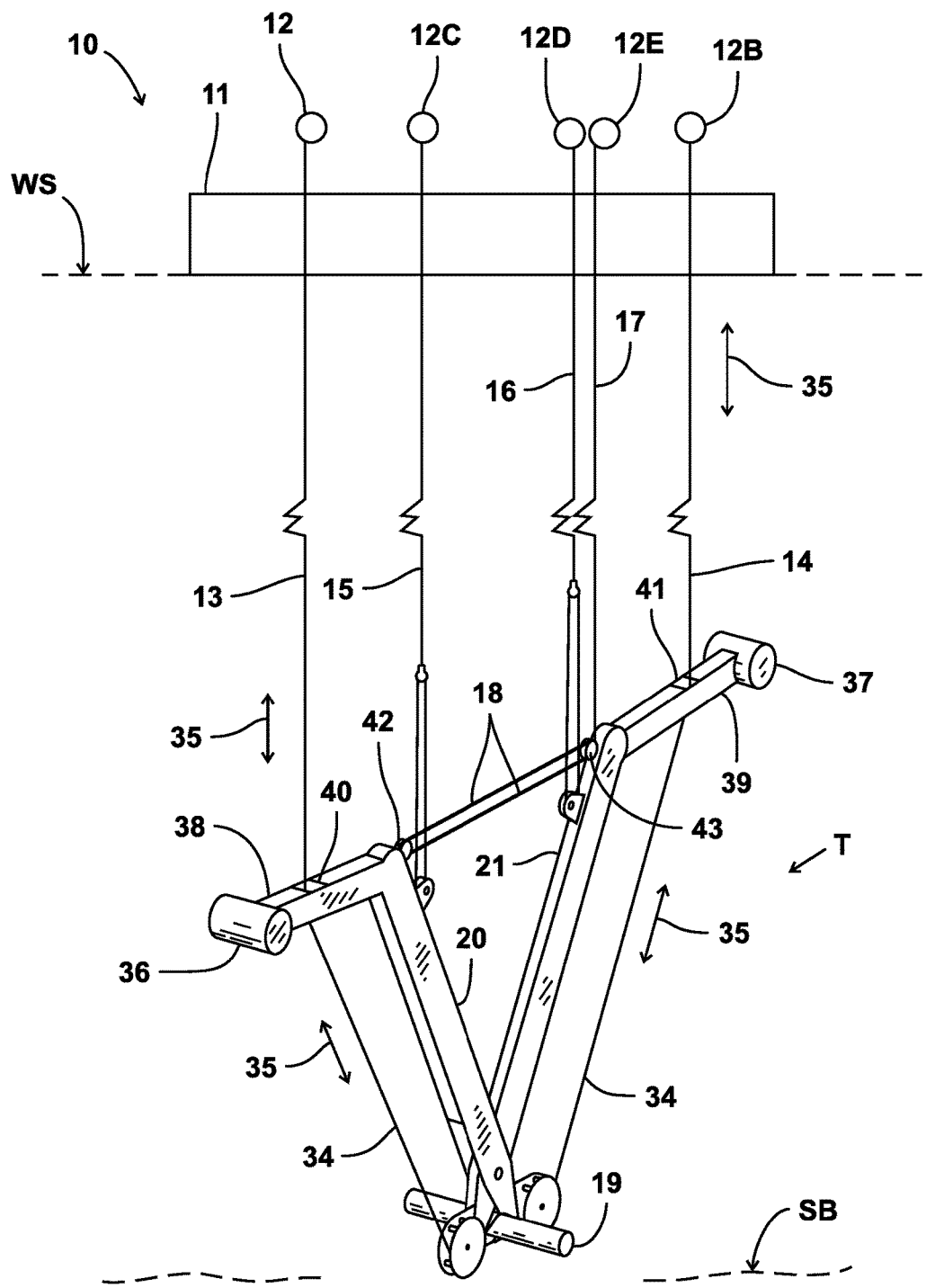
FIG. 1 is a perspective view of the preferred embodiment of the apparatus of the present invention.

FIGS. 1-4 show a preferred embodiment of the apparatus of the present invention, designated by the numeral 10 in FIG. 1. FIGS. 1-4 also show the method of the present invention.

Underwater pipe gripping/lifting and cutting apparatus 10 features a barge or vessel 11 that floats on a water surface WS some distance above a sea bed SB or water bottom. The seabed or water bottom SB has one or more pipelines, pipes, sections of pipeline, tubular members, beams, elongated objects or the like to be salvaged or removed. Such objects are referred to herein as pipes/tubulars/members/beams 19.

Barge or vessel 11 supports multiple winches (e.g., five (5) winches) 12 that each connect to a line or cable 13-17. The lines 13, 14 are in fact part of a cutting line that attaches at line sections 13 to a first winch 12. Line section 14 connects to a second winch 12. In between line sections 13, 14 is a cutting section 34 or a line covered with cutting elements such as tungston carbide cutting elements. As indicated by arrow 35 in FIG. 1, line sections 13, 14, 34 are moved back and forth using two winches 12. As the first winch 12A takes up section 13, the second winch 12B pays out or lets out line section 14. The direction of sections 13, 14, 34 then reverses—second winch 12B takes up section 14 and first winch 12A pays out or lets out section 13. This back and forth movement of line sections 13, 14, 34 repeats multiple times so that the line section 34 "saws" or cuts the tubular pipe, member, pipeline, elongated member or pipeline section 19.

In order to support the pipe 19 and the line sections 13, 14, 34 there is provided a tool T comprised of left frame 20, right frame 21 and connector 22 as seen in FIGS. 1-4. Each frame 20, 21 has a jaw. Frame 20 has jaw 23. Frame 21 has jaw 24. The connector or connection 22 can be a pivot or pivotal connection. The frame members 20, 21 can be moved to force the jaws 23, 24 together so that they grip the pipeline (pipe, beam, tubular, elongated member) 19 as shown in FIGS. 1-4. Once so gripped, the pipe 19 can be cut with line sections 13, 14, 34.

Rigging is provided for opening and closing jaws 23, 24. Rigging is also provided for lifting and lowering the frames 20, 21. The lifting lines 15, 16 are connected to winches 12C and 12D on barge 11 and to padeyes, gussets, lugs 44, 45 (see FIG. 2). Lifting line 15 connects to padeye 44 on left frame 20. Lifting line 16 connects to right frame 21 at padeye 45.

A winch 12E connects to tool spreader line 17 that is used to open and close jaws 23, 24. The spreader line 17 includes a horizontal component 18 which can include spaced apart padeye/gusset/sheave 42, 43. Multiple sections of line 17 can wind back and forth between sheaves 42, 43. When winch 12E pulls up on line 17, sheaves 42, 43 are pulled closer together thus opening jaws 23, 24. When winch 12E pays out or lets out line 17, counterweights or weights 36, 37 pull down on frames 20, 21 closing jaws 23, 24 to grip pipeline section (or other member, tubular, beam or object to be cut) 19. Once so gripped, line sections 13, 14, 34 can be used to cut pipe 19. Line section 13 is rigged to left frame 20 at cable guide/opening/sheave 40. Line section 14 is rigged to right frame section 21 at guide/opening/sheave 41.

Cable cutting section 34 is rigged to cable guides 25, 26. Cable guide 25 includes spaced apart plates 27, 28 (which can be rounded), sheave or cable roller 31 and spacer bars 33. Similarly, cable guide 26 includes spaced apart plates 29, 30 (which can be rounded), sheave or cable roller 32 and spacer bars 33. Note in FIGS. 1-2 that cutting cable 13, 14, 34 is rigged to go under cable roller 31, over pipe section 19 and then under cable roller 32. Each cable roller can be mounted on a shaft, spindle or axle that spans between plates 27, 28 or 29, 30.

Winches 12C, 12D are provided for lines 15, 16 thus enabling tool T to be raised or lowered and between barge 11 and the sea bottom or sea bed SB.

Figure 2:
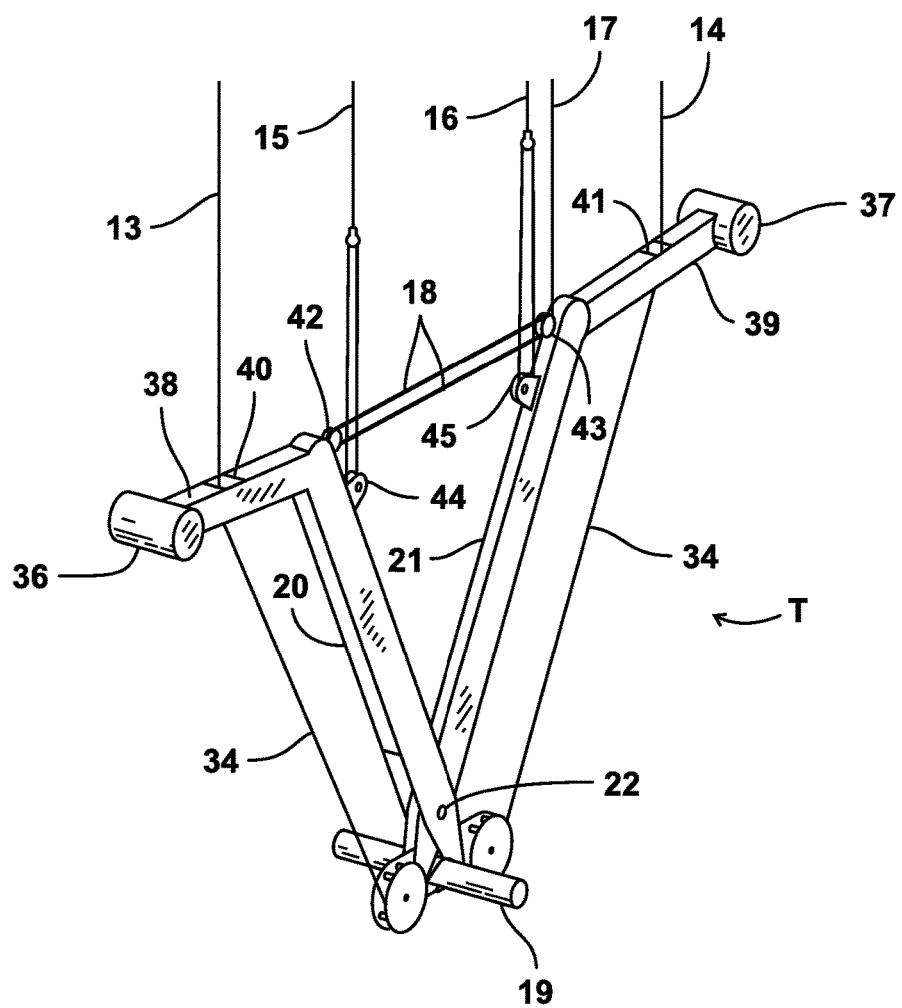
FIG. 2 is a fragmentary perspective view of a preferred embodiment of the apparatus of the present invention.
Figure 3:
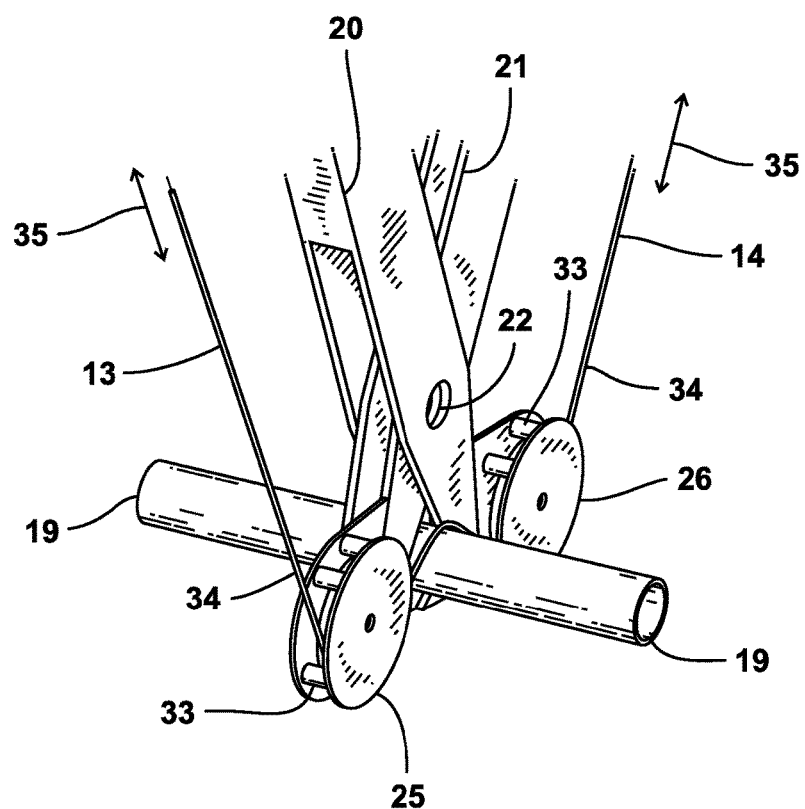
FIG. 3 is a fragmentary perspective view of a preferred embodiment of the apparatus of the present invention.
Figure 4:
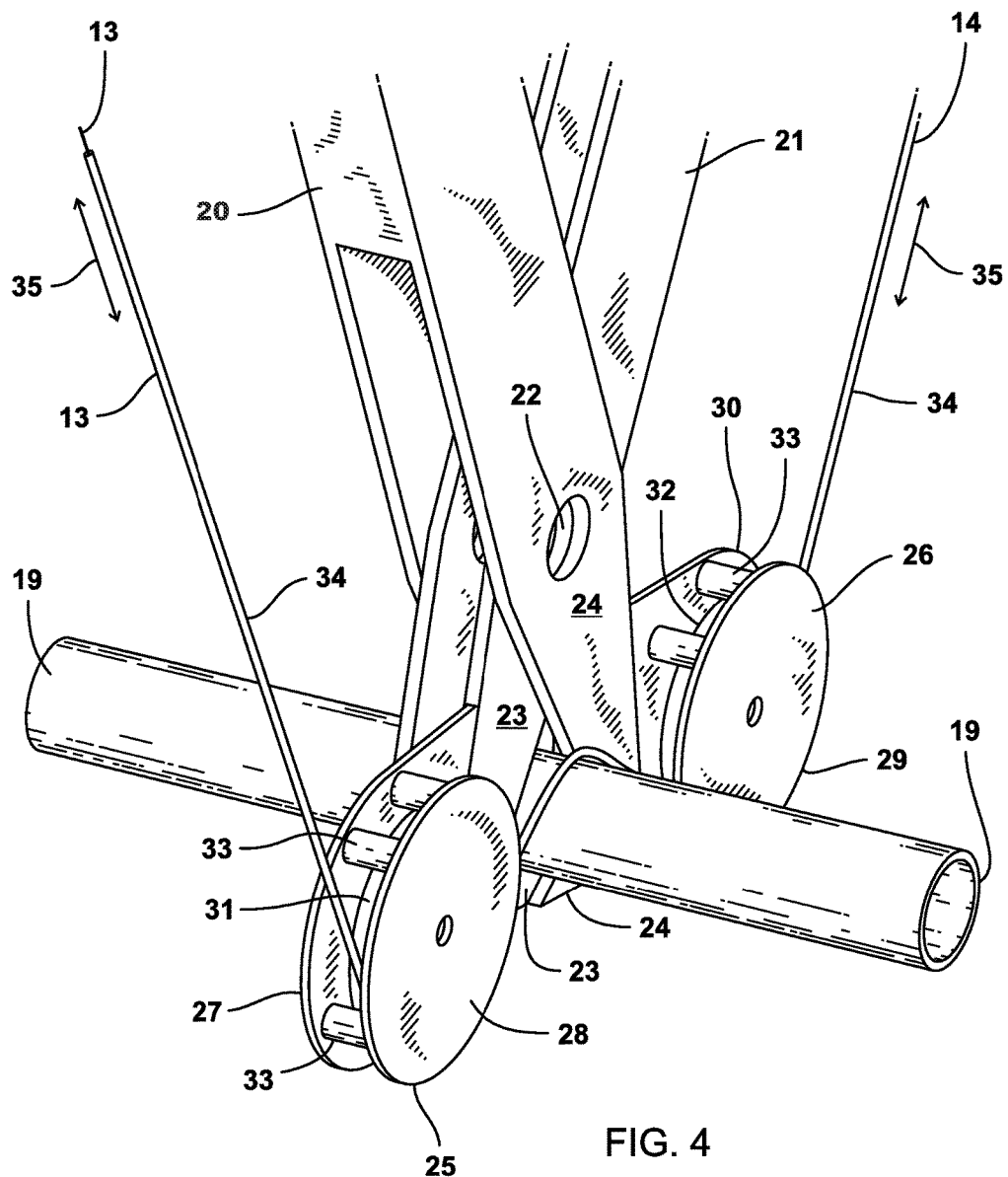
FIG. 4 is a fragmentary perspective view of a preferred embodiment of the apparatus of the present invention.

Each frame 20, 21 has an upper end. Frame 20 has upper end 38. Frame 21 has upper end 39. The weights or counterweights 36, 37 can be located at a frame upper end 38, 39 as seen in FIGS. 1 and 2.

The following is a list of parts and materials suitable for use in the present invention:

| PARTS LIST: | |
| --- | --- |
| PART NUMBER | DESCRIPTION |
| 10 | underwater pipe gripping and cutting apparatus |
| 11 | barge/vessel |

-continued

PARTS LIST:

| PART NUMBER | DESCRIPTION |
|---|---|
| 12A | winch |
| 12B | winch |
| 12C | winch |
| 12D | winch |
| 12E | winch |
| 13 | cutting line section |
| 14 | cutting line section |
| 15 | lifting line |
| 16 | lifting line |
| 17 | tool spreader line |
| 18 | horizontal lines/spreader lines |
| 19 | pipe/member/beam |
| 20 | left frame |
| 21 | right frame |
| 22 | connector/connection/pivot |
| 23 | jaw |
| 24 | jaw |
| 25 | first cable guide |
| 26 | second cable guide |
| 27 | plate/rounded plate |
| 28 | plate/rounded plate |
| 29 | plate/rounded plate |
| 30 | plate/rounded plate |
| 31 | sheave/cable roller |
| 32 | sheave/cable roller |
| 33 | spacer bar |
| 34 | cutting section |
| 35 | arrow |
| 36 | weight/counterweight |
| 37 | weight/counterweight |
| 38 | upper frame end |
| 39 | upper frame end |
| 40 | cable guide/opening/sheave |
| 41 | cable guide/opening/sheave |
| 42 | padeye/gusset/sheave |
| 43 | padeye/gusset/sheave |
| 44 | padeye/gusset/lug |
| 45 | padeye/gusset/lug |
| T | tool |
| SB | sea bottom/water bottom |
| WS | water surface |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An underwater pipe, tubular and elongated member salvage system comprising:
a) a floating vessel;
b) multiple powered cable handling devices on the vessel including one or more winches;
c) a tool that includes a first frame, a second frame and a connection that enables one frame to move relative to the other frame;
d) each frame having a lower end portion with a jaw;
e) each frame having an upper end portion with a counterweight;
f) first rigging between the vessel and the tool that enables the tool to be raised or lowered relative to the vessel;
g) second rigging between the vessel and the tool that enables the jaws to be moved apart;
h) a cutting line having first and second end portions, each said end portion connecting with first and second winches on the vessel;
i) roller guides on the tool that support the cutting line in a position that enables the cutting line to cut a pipe, tubular or elongated member that is gripped between the jaws by movement of the cutting line relative to the pipe tubular or elongated member; and
j) wherein the cutting line engages the upper end portion of each said frame at a bend in the cutting line.

2. The system of claim 1 wherein a relaxation of the second rigging closes the jaws.

3. The system of claim 1 wherein each frame has a generally ell shape.

4. The system of claim 1 wherein each frame has padeyes and first and second lifting lines attached to the padeyes and to the vessel.

5. The system of claim 1 wherein the cutting line engages the uppermost surface of the pipe, tubular or elongated object to be cut.

6. The system of claim 1 wherein each frame has a first roller guide next to the first jaw and a second roller guide next to the second jaw.

7. The system of claim 1 wherein each frame upper end portion has a sheave that is engaged by the cutting line.

8. The system of claim 6 wherein the cutting line engages a lower portion of each said first and second roller guides.

9. The system of claim 1 wherein the cable handling devices are winches.

10. An underwater method of salvage that includes underwater cutting of pipe, tubular, or elongated member, comprising the steps of:
a) providing a floating vessel;
b) providing multiple powered cable handling devices on the vessel including one or more winches;
c) providing a tool that includes a first frame, a second frame and a connection that enables one frame to move relative to the other frame, each frame having a lower end portion with a jaw, and each frame having an upper end portion with a counterweight;
d) rigging cabling between the vessel and the tool that enables the tool to be raised or lowered relative to the vessel;
e) rigging cabling to the tool that enables the jaws to be moved relative to one another between opened and closed positions;
f) rigging a cutting line to the tool having first and second end portions that are positioned to connect with first and second winches on the vessel;
g) using roller guides on the tool to support the cutting line in a position that enables the cutting line to cut the pipe, tubular or elongated member;
h) cutting the pipe, tubular, or elongated member by movement of the cutting line relative to the pipe tubular or elongated member; and
i) wherein in step "h" the pipe tubular or elongated member is held between the jaws of the first and second frames.

11. The method of claim 10 wherein relaxing at least some of the rigging closes the jaws.

12. The method of claim 10 wherein each frame has a generally ell shape.

13. The method of claim 10 wherein each frame has padeyes and first and second lifting lines attached to the padeyes and to the vessel, wherein the lifting lines enable selective raising or lowering of the tool.

14. The method of claim 10 wherein step "h" includes engaging the uppermost surface of the pipe, tubular or elongated object to be cut with the cutting line.

15. The method of claim 10 wherein each frame has a first roller guide next to the first jaw and a second roller guide next to the second jaw, and further comprising supporting the cutting line with said roller guides.

16. The method of claim 10 wherein each frame has an upper end portion with a sheave that is engaged by the cutting line.

17. The method of claim 15 wherein the cutting line engages a lower portion of each said first and second roller guides.

18. The method of claim 10 wherein the cable handling devices of step "b" are winches.

19. An underwater method of cutting an elongated member comprising the steps of:
   a) providing a floating vessel;
   b) providing multiple powered cable handling devices on the vessel including one or more winches;
   c) providing a tool that includes a first frame, a second frame and a connection that connects one frame to the other frame and enables one frame to move relative to the other frame, each frame having a lower end portion with a jaw;
   d) rigging cabling between the vessel and the tool that enables the tool to be raised or lowered relative to the vessel;
   e) rigging cabling to the tool that enables the jaws to be moved relative to one another between opened and closed positions;
   f) rigging a cutting line to the tool, said cutting line having first and second end portions that each connect with a winch on the vessel;
   g) using roller guides on the tool to support the cutting line in a position that enables the cutting line to cut a pipe, tubular or elongated member;
   h) cutting the elongated member by movement of the cutting line relative to the elongated member;
   i) wherein in step "h" the elongated member is held between the jaws of the first and second frames; and
   j) wherein in step "f" the cutting line has a bend in between the vessel and the elongated member.

20. The method of claim 19 wherein the upper end portion of one or both frames has a counterweight.

21. An underwater pipe, tubular and elongated member salvage system comprising:
   a) a floating vessel;
   b) multiple powered cable handling devices located on the vessel including one or more winches;
   c) a tool that includes a first frame, a second frame and a connection that enables one frame to move relative to the other frame;
   d) each frame having an inclined lower end portion with a jaw;
   e) each frame having a laterally extending upper end portion with a counterweight;
   f) each upper end portion and lower end portion are positioned to form an obtuse angle;
   g) first rigging between the vessel and the tool that enables the tool to be raised or lowered relative to the vessel;
   h) second rigging between the vessel and the tool that enables the jaws to be moved apart;
   i) a cutting line having first and second end portions that each connect with a winch on the vessel;
   j) roller guides on the tool that support the cutting line in a position that enables the cutting line to cut a pipe, tubular or elongated member that is gripped between the jaws by movement of the cutting line relative to the pipe tubular or elongated member; and
   k) wherein at least two of the roller guides are spaced inwardly of the counterweights.

22. The system of claim 21 wherein a relaxation of the second rigging closes the jaws.

23. The system of claim 21 wherein each frame has padeyes and the first rigging includes first and second lifting lines attached to the padeyes and to the vessel.

24. The system of claim 21 wherein each frame has a first roller guide next to the first jaw and a second roller guide next to the second jaw.

25. The system of claim 21 wherein each frame upper end portion has a sheave that is engaged by the cutting line.

26. The system of claim 24 wherein the cutting line engages a lower portion of each said first and second roller guides.

27. The system of claim 21 wherein the cable handling devices are winches.

* * * * *